United States Patent Office 3,345,852
Patented Oct. 10, 1967

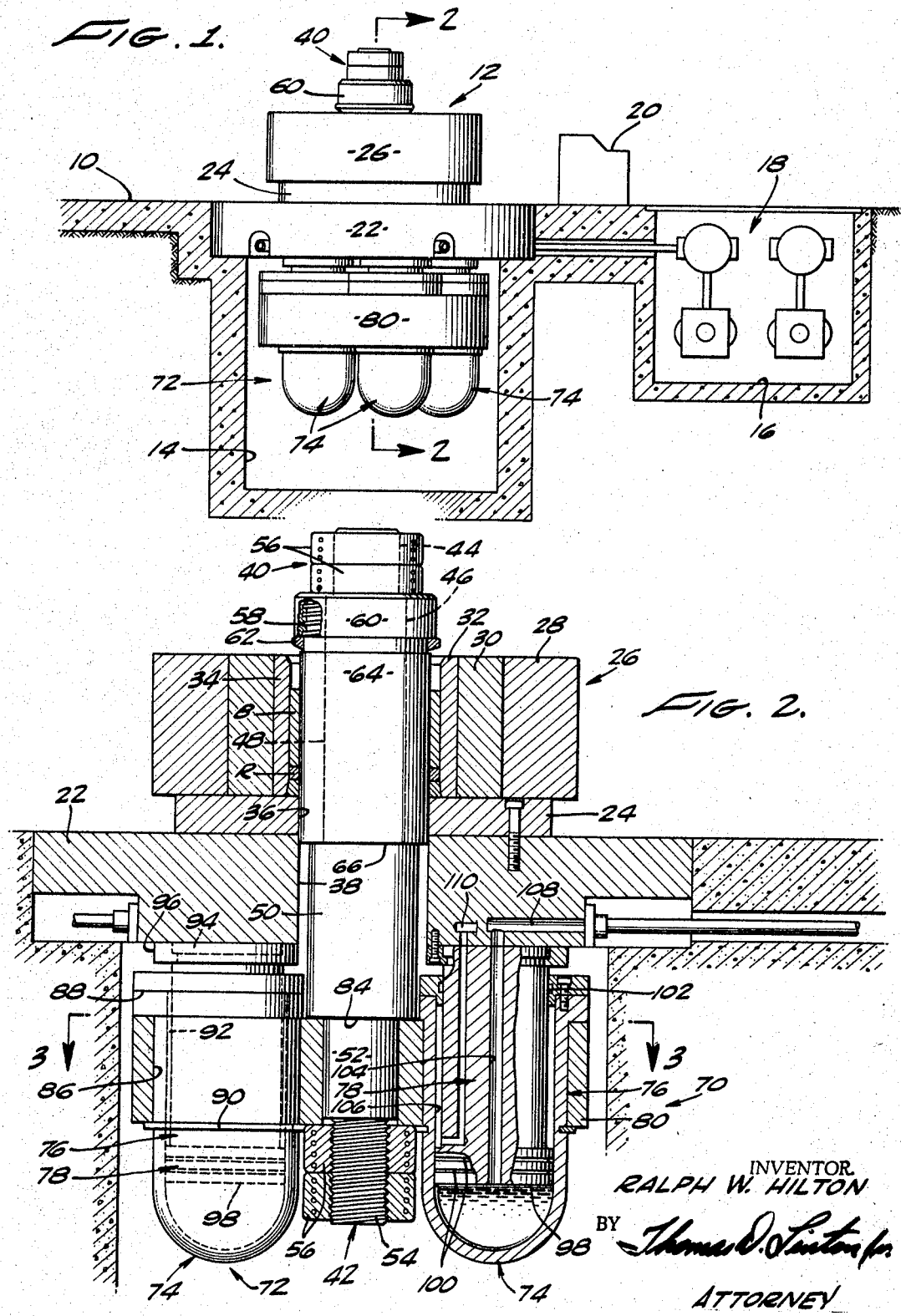

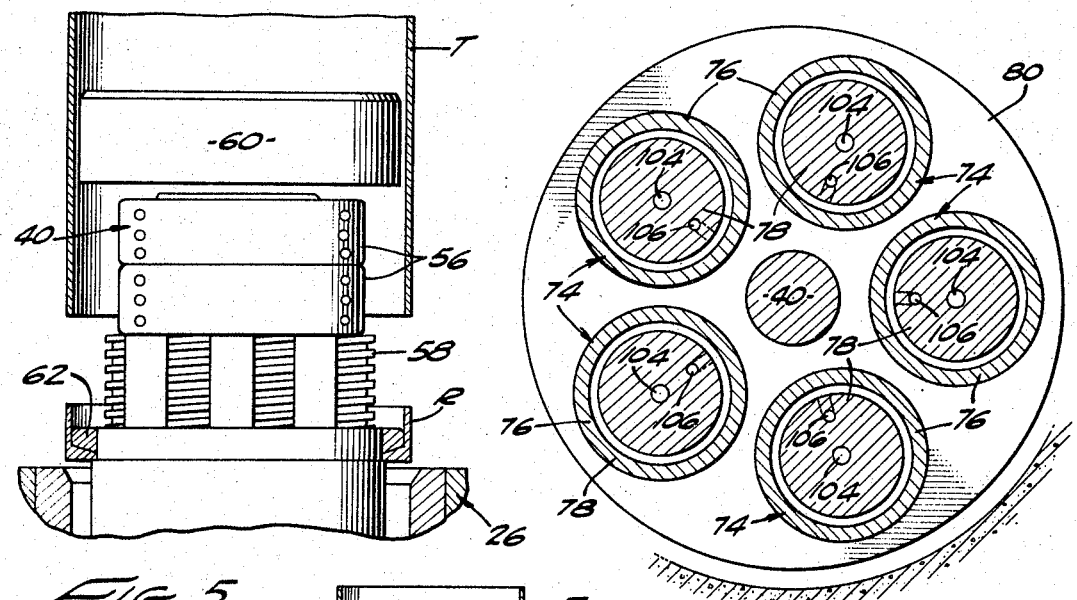
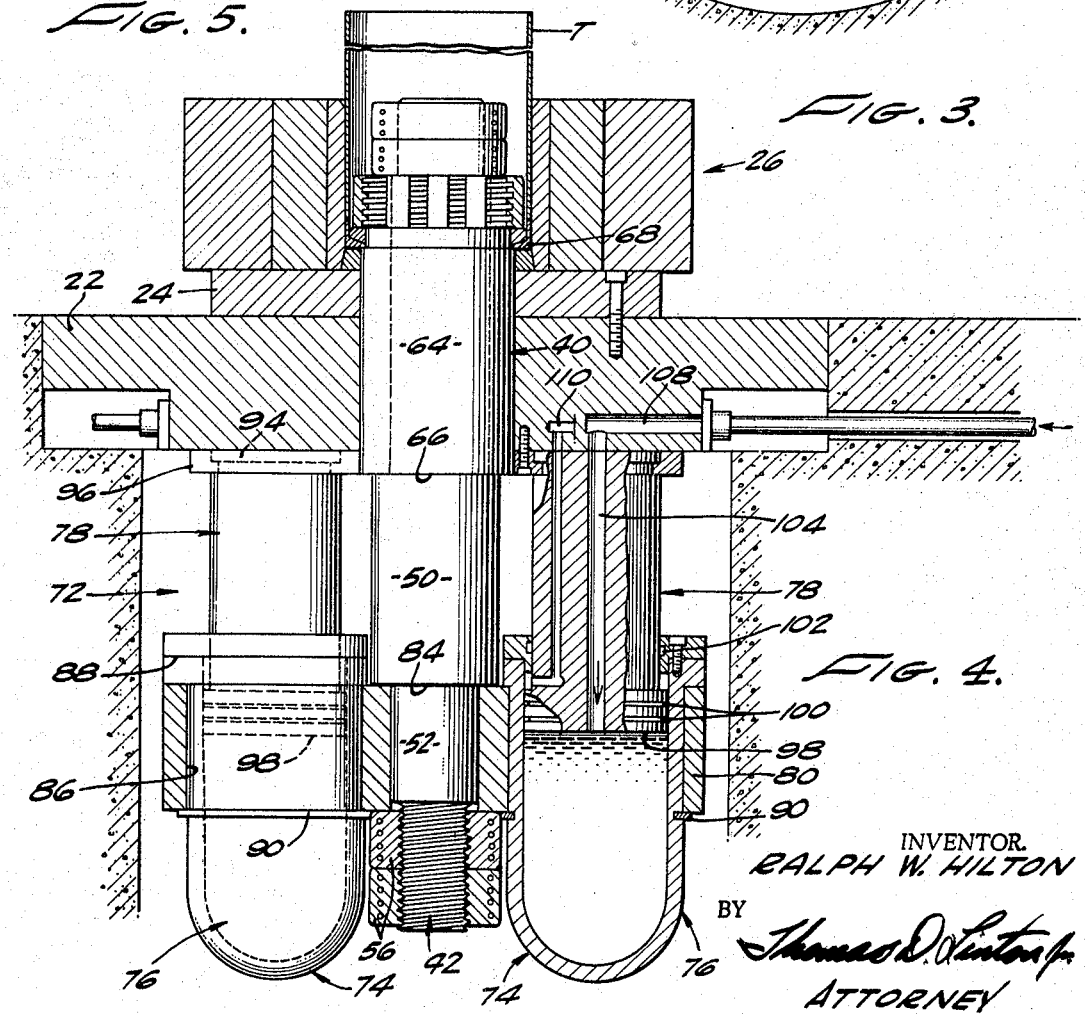

3,345,852
EXTRUSION PRESS
Ralph W. Hilton, Torrance, Calif., assignor to Harvey Aluminum (Incorporated), Torrance, Calif., a corporation of California
Filed Oct. 18, 1965, Ser. No. 496,972
9 Claims. (Cl. 72—253)

This invention relates generally to machines for working metals and other materials and has more particular reference to an extrusion press.

Relatively large diameter tubes or sleeves and other relatively large shapes are commonly fabricated by an extrusion process known as impact extrusion. In this process, a billet of the material to be worked is placed in a die cavity which is open at one end and one or more extrusion members, depending upon the particular extruded shape desired, are driven axially through the open end of the cavity and into the billet. The billet material displaced by the advancing extrusion member is forced outwardly through an extrusion opening defined, at least in part, by the extrusion member and finally through the open end of the die cavity. When extruding a cylindrical tube or sleeve, for example, the die cavity and the extrusion member are circular in transverse cross section and an annular clearance space of predetermined radial dimension is provided between the inner wall of the cavity and the leading end of the extrusion member. This annular clearance space defines the extrusion opening through which the work material displaced by the advancing extrusion member is forced, or extruded, in a cylindrical shape of radial thickness and diameter corresponding to the radial width and diameter, respectively, of the opening. Parts formed in this way possess many characteristics superior to those of a similar part fabricated by other techniques, such as a conventional extrusion process. Among these superior characteristics are increased strength and accuracy.

A conventional extrusion press for use in the impact extrusion process is equipped with one or more hydraulic power cylinders which are located in front of the extrusion die, i.e., opposite the open end of the die cavity, and are axially spaced from the die. The piston rods of the power cylinders are operatively coupled to the extrusion member, or members, which extend forwardly from the cylinders toward the die. The power cylinders are anchored to the die by tie rods.

This conventional extrustion press construction has several disadvantages. First, the existing presses are extremely large and, therefore, require a substantial work area for their installation. Several factors contribute to this large size of the press. This, the extrusion member of such a press must be sufficiently long to extend completely through the finally extruded part into the die cavity. The reason for this, of course, is that the part is extruded from the open end of the die cavity, toward the power cylinders, in surrounding relation to the extrusion member. Moreover, the spacing between the power cylinders and the ide must be greater than this required length of the extrusion member to accommodate the coupling for joining the member to the piston rods of the power cylinders and further to accommodate retraction of the extrusion member a sufficient distance from the die to permit placement of the work billet in the die cavity. As a consequence, the existing extrusion presses are very long and are generally required to operate in a horizontal position.

Another disadvantage of the existing extrusion presses resides in the fact that the extrusion member of such a press is loaded in compression during the extrusion cycle. As a result, the member must be provided with sufficient strength to resist the resultant bending srtess created in the member. Moverover, the extrusion member, being compressively loaded as it is, is prone to wandering laterally. This results in extruded parts of poor quality and in non-uniformity of successively extruded parts.

A further disadvantage of the existing extrusion presses under discussion is that the tie rods of these presses are stressed in tension during each extrusion cycle. Accordingly, the rods stretch a small amount in the course of each cycle and, therefore, the rods must be periodically readjusted. When the limiting adjustment of the rods has been reached, they must be replaced. Such periodic adjustment and eventual replacement of the tie rods is time consuming and costly and requires periodic removal of the existing presses from service.

It is evident at this point, therefore, that a definite need exists for an improved extrusion press which is not subject to the foregoing and other disadvantages of the existing extrusion presses.

A general object of the present invention is to provide such an improved extrusion press.

Another object of the invention is to provide an improved extrusion press which is devoid of the tie rods or other comparable load bearing elements which are subject to elongation during the extrusion cycle.

Yet another object of the invention is to provide an improved extrusion press wherein the connecting rod for driving the extrusion member or members in their extruding stroke is loaded in tension rather than compression during the extrusion cycle, whereby the rod is not subjected to bending stresses and does not tend to wander laterally under extrusion loading, and extruded parts of superior quality, appreciably greater accuracy, and substantially more uniformity are obtained.

A further object of the invention is to provide an improved extrusion press which is relatively compact in size and adapted for installation in an upright position, whereby the press requires minimum work area.

Yet a further object of the invention is to provide an improved extrusion press which may be employed to fabricate a wide variety of extruded shapes.

A still further object of the invention is to provide an improved extrusion press which is relatively simple in construction, economical to manufacture, reliable in operation, and otherwise ideally suited to its intended purposes.

Other objects, advantages, and features of the invention will present themselves to those skilled in the art as the description proceeds.

With these and other objects in view, the invention consists in the construction, arrangement, and combination of parts of the invention, whereby the objects contemplated are attained as hereinafter set forth, pointed out in the appended claims, and illustrated in the attached drawings.

In these drawings:

FIG. 1 is a side elevation of an improved extrusion press according to the invention, showing the press installed and illustrating certain associated equipment required for operation of the press;

FIG. 2 is an enlarged vertical section through the press in FIG. 1, taken substantially on line 2—2 in the latter figure, and showing the press at the outset of an extrusion cycle;

FIG. 3 is a horizontal section through the press taken on line 3—3 in FIG. 2;

FIG. 4 is a section similar to FIG. 2 showing the press at the conclusion of the extrusion operation; and FIG. 5 is an enlarged fragmentary view of the upper end of the press, illustrating the extruded part being removed at the conclusion of the extrusion cycle.

In FIG. 1 of these drawings, there is illustrated the floor or foundation 10 of a typical industrial work area in which the present extrusion press 12 may be installed. The foundation 10 has a well 14 recessed therein to receive the press. The manner in which the press is supported will be explained shortly. To one side of the well 14 is a second well 16 for containing certain hydraulic equipment 18 to be referred to later. A control console 20 for the press is shown to be situated between the wells. One advantage of the present extrusion press 12 is that it may be installed in the upright position of FIG. 1. This is desirable for the reason that the press occupies minimum floor space in this upright position. However, as will be evident from the ensuing description, the press may be mounted in a horizontal position, if desired.

Referring now more particularly to FIGS. 2–5, the illustrated extrusion press 12 will be seen to comprise a supporting plate 22, or bolster as it is commonly referred to. Secured to the upper surface of this bolster is a spacer plate 24 which may be of somewhat smaller edgewise dimensions than the bolster, as shown. An extrusion die assembly 26 is attached, by means not shown, to the upper surface of the spacer plate. This die assembly is composed of an outer housing or ring 28, an intermediate compression ring 30, and an inner sleeve 32. The sleeve 32 is press fitted in the compression ring 30, and the latter ring, in turn, is fitted in the outer ring 28 in such a way as to provide the extrusion die assembly 26 with sufficient strength to resist the radial loads which are exerted on the assembly during the extrusion cycle. The central opening 34 through the inner sleeve 32 defines an extrusion die cavity. The upper and lower extremities of the cylindrical wall of this cavity are preferably flared or beveled slightly, as shown.

Extending through the bolster 22 and spacer plate 24 in coaxial alignment with the die cavity 34 are bores 36 and 38. A pull rod 40 is slidably fitted in these bores. Pull rod 40 is composed of a central, cylindrical rod member 42 having several cylindrical sections 44, 46, 48, 50, 52 and 54 of the different diameters illustrated. The upper and lower rod sections 44 and 54 are threaded to receive retainer nuts 56. The upper rod section 46 has an interrupted thread 58 to receive a quick release nut 60. The remaining rod sections 48, 50 and 52 have smooth external cylindrical surfaces. Slidably fitted on the rod section 48 is an extrusion member, or extrusion ring, 62 and a hollow sleeve mandrel 64. This mandrel is externally dimensioned to fit slidably within the spacer plate and bolster bores 36, 38, respectively. Extrusion ring 62 and mandrel 64 are axially confined between the quick release nut 60 and an upwardly presented, annular shoulder 66 which is defined at the juncture of the pull rod sections 48 and 50.

The external diameter of the extrusion ring 62 is smaller by a predetermined amount than the internal diameter of extrusion die cavity 34. Accordingly, when the extrusion ring is located within the cavity, there is defined between the ring and the cylindrical wall of the cavity an annular clearance space 68 through which material is extruded during the extrusion cycle. This clearance space is hereinafter referred to as an extrusion opening. The undersurface of the extrusion ring is beveled, as shown, in accordance with conventional practice.

During the extrusion cycle, described below, the pull rod 40 is driven from its initial position of FIG. 2, through its limiting position of FIG. 4, to its final position of FIG. 5. The pull rod is thus driven by drive means 70 mounted on the underside of the bolster 22.

Drive means 70 comprise a cluster 72 of double-acting hydraulic power cylinders 74. These power cylinders are uniformly spaced about the pull rod 40 with the cylinder axes parallel to the axis of the pull rod. Each power cylinder has an outer cylinder part 76 and an inner piston part 78. One part of each power cylinder is anchored to the bolster 22 and the other cylinder part is anchored to the pull rod 40 in such a way as to render the power cylinders effective to drive the pull rod axially. In the particular drive means 70 chosen for illustration, the cylinder parts 76 are anchored to the pull rod and the piston parts 78 are anchored to the bolster.

To this end, there is coaxially fitted on the lower cylindrical section 52 of the pull rod 40 a disc-shaped thrust member or plate 80. This thrust plate is axially confined between the lower retaining nuts 56 on the pull rod and an annular, downwardly presented shoulder 84 on the rod member 42 at the juncture of the rod sections 52, 54. The cylinder parts 76 of the power cylinders 74 are slidably fitted in bores 86 in the thrust plate 80 and are axially retained in these bores by external, downwardly presented shoulders 88 on the upper ends of the cylinder parts, above the thrust plate, and snap rings 90 fitted in external grooves in the cylinder parts below the thrust plate.

The piston part 78 of each power cylinder 74 has a relatively large diameter body 92 terminating at its upper end in an external flange 94. Fitted over this upper flanged end of the piston parts are internally flanged retainer rings 96 which are bolted to the underside of the bolster 22, thus to rigidly secure the piston parts to the bolster. The head 98 of each piston part 78 is sealed by rings 100 to the internal surface of the respective cylinder part 76. Each cylinder part is sealed by a ring 102 to the body of its respective piston part.

Extending axially through and opening through the upper and lower end faces of the piston part 78 of each hydraulic power cylinder 74 is a hydraulic fluid passage 104. A second hydraulic fluid passage extends axially through each piston part and opens at its upper end through the upper end face of the respective piston part and at its lower end to the interior of the corresponding cylinder part 76, just above the respective piston head 98. Passages 104 and 106 communicate to the hydraulic equipment 18 in the well 16 via passages 108 and 110, respectively. Hydraulic equipment 18 comprises a conventional hydraulic system for delivering fluid under pressure to either of the passages 104 or 106 in the piston parts 78 and venting the remaining passages. The controls for this hydraulic system are located at the control console 20.

The present extrusion press 12 is installed in the foundation well 14 with the perimetrical edge portion of the press bolster 22 seating in an annular recess at the upper end of the well, as shown. The bolster may be bolted or otherwise anchored to the foundation 10 to secure the press in position. Preferably, the upper surface of the bolster is flush with the floor surface of the foundation. The bottom wall of the well 14 is located a distance below the lower ends of the cylinder parts 76. The various components of the press 12 may be subjected to any desired hardening treatments to provide the components with the requisite strength and wear resistance.

In operation of the extrusion press 12, the pull rod drive means 70 is pressurized in a direction to elevate the pull rod 40 to its initial position of FIG. 2. The quick release nut 60 and extrusion ring 62 are then removed from the pull rod, and a cylindrical billet B of the extrusible material to be formed is placed in the die cavity 34, about the pull rod mandrel 64, as shown. Thereafter, the extrusion ring and quick release nut are replaced on the pull rod. The pull rod drive means 70 are then pressurized to drive or pull the pull rod 40 downwardly through the die cavity 34 to the lower limiting position of the pull rod shown in FIG. 4.

As the pull rod 40 descends through the cavity, the material of the billet B is displaced upwardly through the cavity in such a way that the material is extruded through the annular extrusion opening 68 as a cylindrical shape or tube T. At the conclusion of the extrusion operation, the pull rod 40 is elevated to its final (initial) position of FIG. 5 and the extruded shape is removed, along with the quick release nut 60, as shown. The nut is then removed from the part. In accordance with conventional practice, an extrusible butt ring R may be placed in the bottom of the die cavity 34, below the billet B, to eliminate the necessity of severing the butt ring from the extruded shape.

A die cavity 34 and extrusion ring 62 suitable for extruding a cylindrical shape or tube have been illustrated. A wide variety of other shapes may be extruded by employing corresponding die cavity and extrusion ring shapes. Also, the present press may be employed for both hot and cold extrusion processes.

It is now evident that the extrusion press described above and illustrated in the drawings achieves the several objects and advantages set forth earlier. Thus, the press is very compact and occupies minimum floor space. Further the press is devoid of tie rods or other comparable elements which may elongate in use, as do the tie rods of the existing extrusion press. The pull rod 40, being loaded in tension, as it is, during the extrusion cycle, is not subject to bending stress or lateral wandering. Accordingly, the press produces substantially more uniform extruded shapes of significantly higher quality than the existing presses.

While the invention has been described in what is conceived to be its most practical and preferred embodiment, various modifications of the invention are possible within the spirit and scope of the following claims.

What is claimed is:

1. An extrusion press comprising:
    an extrusion die having a cavity open at one end and closed at its opposite end by an end wall,
    extrusion means axially movable in said cavity,
    said cavity being adapted to receive between said cavity end wall and said extrusion means a billet of extrusible material,
    there being an extrusion opening axially of said extrusion means through which said material is extruded by axial movement of said extrusion means toward said cavity end wall,
    pull rod means extending axially of said cavity,
    means securing said extrusion means to one end of said pull rod means,
    the other end of said pull rod means extending beyond the closed end of said cavity, whereby axial movement of said pull rod means in the direction of said other end thereof is effective to axially move said extrusion means in said cavity toward said cavity end wall, and
    drive means operatively connected between said extrusion die and said other end of said pull rod means for driving said rod means in said axial direction by exerting a pulling force on said rod means, whereby the axial stress in said pull rod means during extrusion of said billet is a tensile stress.

2. An extrusion press comprising:
    an extrusion die having a cavity open at one end and closed at the other end by an end wall,
    a pull rod having one end extending axially through said die and its other end extending beyond said closed end of said die cavity,
    extrusion means mounted on said one end of said pull rod for axial movement of said extrusion means in said cavity by axial movement of said pull rod relative to said die,
    said cavity being adapted to receive between said cavity end wall and said extrusion means a billet of extrusible material,
    there being an extrusion opening axially of said extrusion means through which said material is extruded by axial movement of said extrusion means toward said cavity end wall upon axial movement of said pull rod in the direction of said other end thereof, and
    drive means operatively connected between said extrusion die and said other end of said pull rod for driving said rod in said axial direction by exerting a pulling force on said rod, whereby the axial stress in said pull rod during extrusion of said billet is a tensile stress.

3. An extrusion press comprising:
    an extrusion die having a cavity open at one end and closed at its other end by an end wall,
    a pull rod extending axially through said cavity and said end wall thereof, whereby said pull rod has one end located in said cavity and its other end located beyond said closed end of said cavity,
    said one end of said pull rod defining an inner side wall of said cavity and said cavity having an outer side wall spaced from said inner wall,
    extrusion means mounted on said one end of said pull rod for axial movement of said extrusion means in said cavity by axial movement of said pull rod relative to said die,
    said cavity being adapted to receive between said cavity end wall and said extrusion means a billet of extrusible material,
    there being an extrusion opening axially of said extrusion means through which said material is extruded by axial movement of said extrusion means toward said cavity end wall upon axial movement of said pull rod in the direction of said other end thereof, and
    drive means operatively connected between said extrusion die and said other end of said pull rod for driving said rod in said axial direction by exerting a pulling force on said rod, whereby the axial stress in said pull rod during extrusion of said billet is a tensile stress.

4. An extrusion press according to claim 3 wherein:
    said extrusion means comprises an extrusion ring removably fitted on said one end of said pull rod, and
    said extrusion ring being spaced from the outer wall of said die cavity to define therebetween said extrusion opening.

5. An extrusion press comprising:
    a mounting plate,
    an extrusion die mounted on one side of said plate and having a cavity,
    the end of said cavity remote from said plate being open and the end of said cavity adjacent said plate being closed by an end wall,
    pull rod means extending through said plate axially of said die, whereby said rod means has one end located at said one side of said plate and its other end located at the opposite side of said plate,
    extrusion means axially movable in said cavity,
    means mounting said extrusion means on said one end of said pull rod means for axial movement of said extrusion means in said cavity by axial movement of said pull rod means,
    said cavity being adapted to receive between said cavity end wall and said extrusion means a billet of extrusible material,
    there being an extrusion opening axially of said extrusion means through which said material is extruded by axial movement of said extrusion means toward said cavity end wall upon axial movement of said pull rod means in the direction of said other end thereof, and
    drive means mounted on said opposite side of said plate and operatively connected to said other end of said pull rod means for driving said rod means in said direction by exerting a pulling force on said rod means, whereby the axial stress in said rod means during extrusion of said billet is a tensile stress.

6. An extrusion press according to claim 5 wherein: said drive means comprises hydraulic cylinder means extending axially of said pull rod means and acting between said rod means and mounting plate.

7. An extrusion press comprising:

a mounting plate, an extrusion die mounted on one side of said plate and having a cavity, the end of said cavity remote from said plate being open and the end of said cavity adjacent said plate being closed by an end wall, a pull rod extending through said plate axially of said die, whereby said rod has one end located at said one side of said plate and its other end located at the opposite side of said plate, extrusion means axially movable in said cavity, means mounting said extrusion means on said one end of said pull rod for axial movement of said extrusion means in said cavity by axial movement of said pull rod, said cavity being adapted to receive between said cavity end wall and said extrusion means a billet of extrusible material, there being an extrusion opening axially of said extrusion means through which said material is extruded by axial movement of said extrusion means toward said cavity end wall upon axial movement of said pull rod in the direction of said other end thereof, and a cluster of hydraulic power cylinders mounted on said opposite side of said plate about and parallel to said pull rod and operatively connected to said pull rod for driving said pull rod in said direction by exerting a pulling force on said rod, whereby axial stress in said rod during extrusion of said billet is a tensile stress.

8. An extrusion press according to claim 7 wherein: each of said power cylinders includes a relatively stationary member fixed to said mounting plate and a relatively movable member, and a thrust member fixed to said other end of said pull rod in a plane generally normal thereto and secured to said relatively movable members of said power cylinders.

9. An extrusion press according to claim 7 wherein: each of said power cylinders comprises a piston part parallel to said pull rod and fixed to said mounting plate and a cylinder part movable on said piston part, a thrust plate fixed to said other end of said pull rod in a plane generally normal thereto and having openings receiving said cylinder parts of said power cylinders, and means securing said cylinder parts to said thrust plate.

References Cited

UNITED STATES PATENTS

| | | | |
|---|---|---|---|
| 2,225,902 | 12/1940 | Cartwright | 72—266 |
| 2,979,195 | 4/1961 | Martin | 72—267 |

FOREIGN PATENTS

| | | |
|---|---|---|
| 525,430 | 4/1931 | Germany. |

CHARLES W. LANHAM, *Primary Examiner.*

K. C. DECKER, *Examiner.*